(12) United States Patent
Abernathy et al.

(10) Patent No.: US 8,082,423 B2
(45) Date of Patent: Dec. 20, 2011

(54) GENERATING A FLUSH VECTOR FROM A FIRST EXECUTION UNIT DIRECTLY TO EVERY OTHER EXECUTION UNIT OF A PLURALITY OF EXECUTION UNITS IN ORDER TO BLOCK ALL REGISTER UPDATES

(75) Inventors: Christopher Michael Abernathy, Austin, TX (US); Kurt Alan Feiste, Austin, TX (US); David Scott Ray, Georgetown, TX (US); David Shippy, Austin, TX (US); Albert James Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 11/201,683

(22) Filed: Aug. 11, 2005

(65) Prior Publication Data

US 2007/0198814 A1 Aug. 23, 2007

(51) Int. Cl.
*G06F 9/30* (2006.01)

(52) U.S. Cl. ......................................... 712/218; 712/244
(58) Field of Classification Search .................. None
See application file for complete search history.

(56) References Cited

U.S. PATENT DOCUMENTS

| 5,913,049 A * | 6/1999 | Shiell et al. ................... 712/215 |
| 6,282,636 B1 * | 8/2001 | Yeh et al. ...................... 712/218 |
| 6,598,156 B1 * | 7/2003 | Arora ............................. 712/244 |
| 6,728,865 B1 * | 4/2004 | Coon et al. ..................... 712/204 |
| 2004/0244000 A1 * | 12/2004 | Frank et al. ....................... 718/1 |

* cited by examiner

*Primary Examiner* — Keith Vicary
(74) *Attorney, Agent, or Firm* — Yee & Associates, P.C.; Matthew B. Talpis (57) ABSTRACT

A method and apparatus are provided for detecting and handling an instruction flush in a microprocessor system. A flush mechanism is provided that is distributed across all of the execution units in a data processing system. The flush mechanism does not require a central collection point to re-distribute the flush signals to the execution units. Each unit generates a flush vector to all other execution units which is used to block register updates for the flushed instructions.

1 Claim, 4 Drawing Sheets

GENERATING A FLUSH VECTOR FROM A FIRST EXECUTION UNIT DIRECTLY TO EVERY OTHER EXECUTION UNIT OF A PLURALITY OF EXECUTION UNITS IN ORDER TO BLOCK ALL REGISTER UPDATES

BACKGROUND OF THE INVENTION

1. Field of the Invention

The present invention relates to detecting and handling an instruction flush in a data processing system. More specifically, the present invention is directed to distributing a flush mechanism across all the execution units in a data processing system.

2. Description of the Related Art

A microprocessor is the heart of a modern computer, a chip made up of millions of transistors and other elements organized into specific functional operating units, including arithmetic units, cache memory and memory management, predictive logic and data movement.

Processors in modern computers have grown tremendously in performance, capabilities and complexity over the past decade. Any computer program consists of many instructions for operating on data. A processor executes the program through four operating stages: fetch, decode, execute and retire (or complete). The fetch stage reads a program's instructions and any needed data into the processor. The decode stage determines the purpose of the instruction and passes it to the appropriate hardware element. The execution stage is where that hardware element, now freshly fed with an instruction and data, carries out the instruction. This hardware element might be an add, bit-shift, floating-point multiply or vector operation. The retire stage takes the results of the execution stage and places them into other processor registers or the computer's main memory. For example, the result of an add operation might be stored in memory for later use.

Processor circuitry is organized into separate logic elements—perhaps a dozen or more—called execution units. The execution units work in concert to implement the four operating stages. The capabilities of the execution units often overlap among the processing stages. The following are examples of some common processor execution units:

Arithmetic logic unit: Processes all arithmetic operations. Sometimes this unit is divided into subunits, one to handle all integer add and subtract instructions, and another for the computationally complex integer multiply and divide instructions.

Floating-point unit (FPU): Deals with all floating-point (non-integer) operations. In earlier times, the FPU was an external coprocessor; today, it's integrated on-chip to speed up operations.

Load/store unit (LSU): Manages the instructions that read or write to memory.

Memory-management unit (MMU): Translates an application's addresses into physical memory addresses. This allows an operating system to map an application's code and data in different virtual address spaces, which lets the MMU offer memory-protection services.

Branch processing unit (BPU): Predicts the outcome of a branch instruction, aiming to reduce disruptions in the flow of instructions and data into the processor when an execution thread jumps to a new memory location, typically as the outcome of a comparison operation or the end of a loop.

Vector processing unit (VPU): Handles vector-based, single-instruction multiple data (SIMD) instructions that accelerate graphics operations.

A common problem found in high performance microprocessor designs is detecting and handling instruction flush. When executing instructions speculatively, if the results of the execution are based on a misprediction, the instructions must be re-executed. The most severe penalty for mis-predicting instruction execution results in an instruction flush which causes the results of that instruction and all following instructions to be thrown away. Instruction processing starts over with fetching the instruction flush. Instruction flush occurs in high performance microprocessor designs due to the desire to fetch and execute instructions speculatively, prior to ensuring all prior instructions have completed cleanly with no errors. Some examples which cause instruction flush are branch mispredict or other load/store fault conditions such as page faults. During a branch mispredict, instructions which have been fetched and executed down the mispredicted path are flushed. During a load/store flush, all younger instructions after the faulting instruction are flushed.

Most microprocessor architectures specify that a program will appear to execute in sequential order. A given instruction is younger than instructions which will execute earlier in the program code. Prior high performance designs, such as POWER4™, implement a central flush mechanism in which flush signals are generated from each unit, then collected in a completion unit, then re-distributed back to all units with a global flush signal. In high frequency designs, this central method is limiting because it requires additional pipeline stages to receive flush signals from each unit, collect them, then re-distribute a global flush signal.

Thus, it would be advantageous to provide a method and apparatus to distribute a flush mechanism across all the execution units in a data processing system, and not require a central collection point to re-distribute the flush signals.

SUMMARY OF THE INVENTION

The present invention provides a method and apparatus for handling instruction flushes. An instruction is received in a first execution unit in a plurality of execution units. A determination is made as to whether the instruction causes an instruction flush. If the instruction causes a flush condition, then a flush vector is issued, and younger instructions are flushed based on the flush vector. This flush vector causes the register update to be blocked for the flushed instructions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
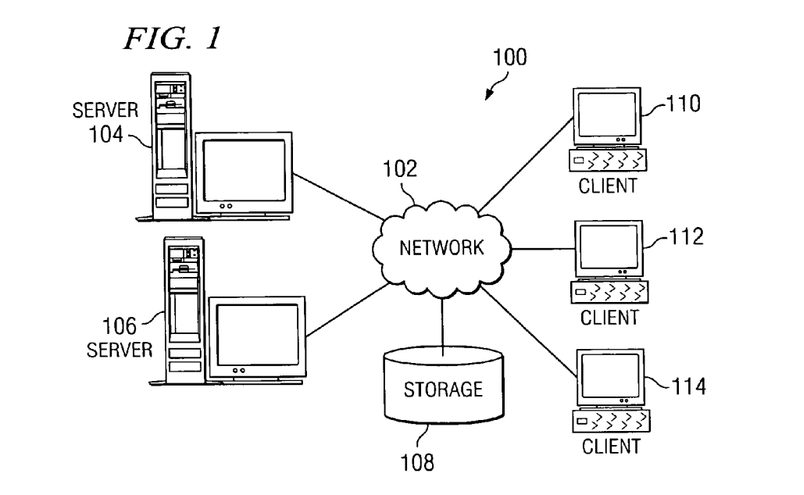
FIG. 1 depicts a pictorial representation of a network of data processing systems in which aspects of the present invention may be implemented.
Figure 2:
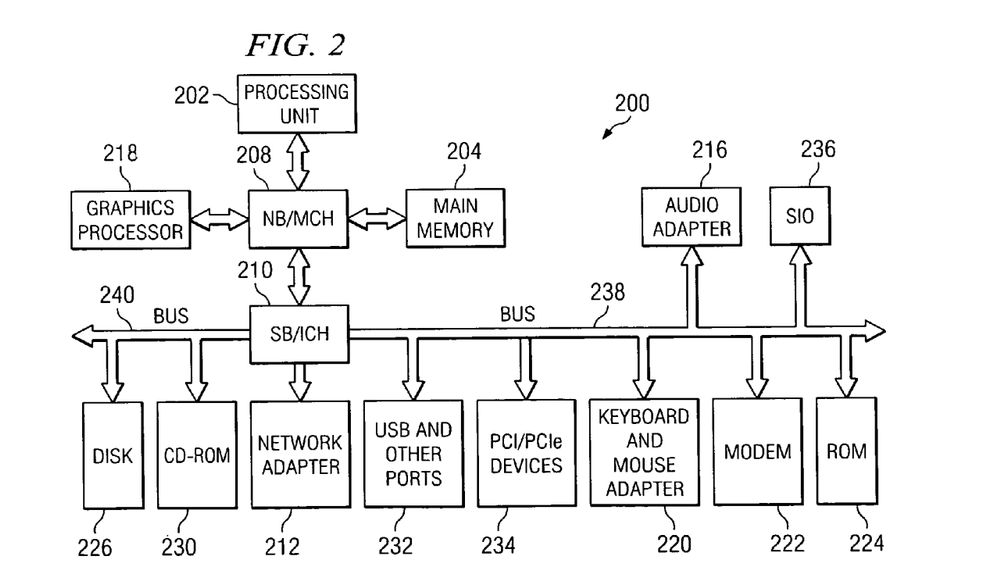
FIG. 2 depicts a block diagram of a data processing system is shown in which aspects of the present invention may be implemented.

The present invention provides a method and apparatus for distributing a flush mechanism across all of the execution units in a microprocessor system. FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects of embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 108 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

As some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 204, read only memory 224, or a cache such as found in north bridge and memory controller hub 208 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3A:
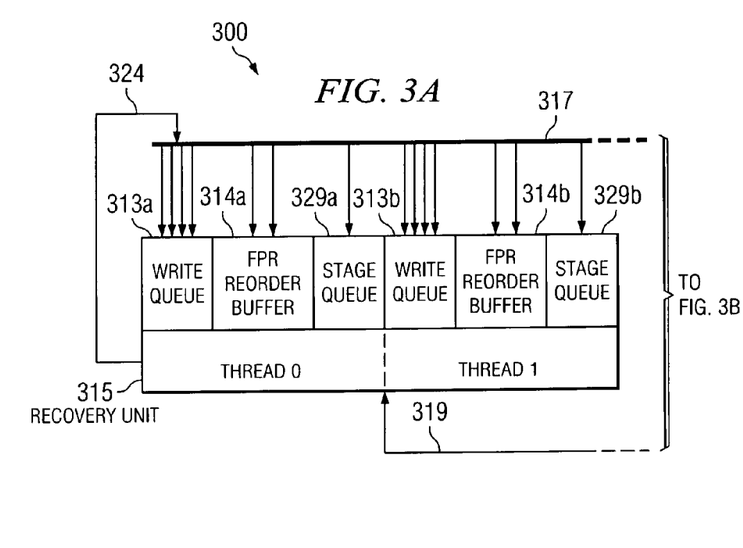
FIGS. 3A and 3B depict an exemplary block diagram of a dual threaded processor design showing functional units and registers in accordance with an illustrative embodiment of the present invention.
Figure 3B:
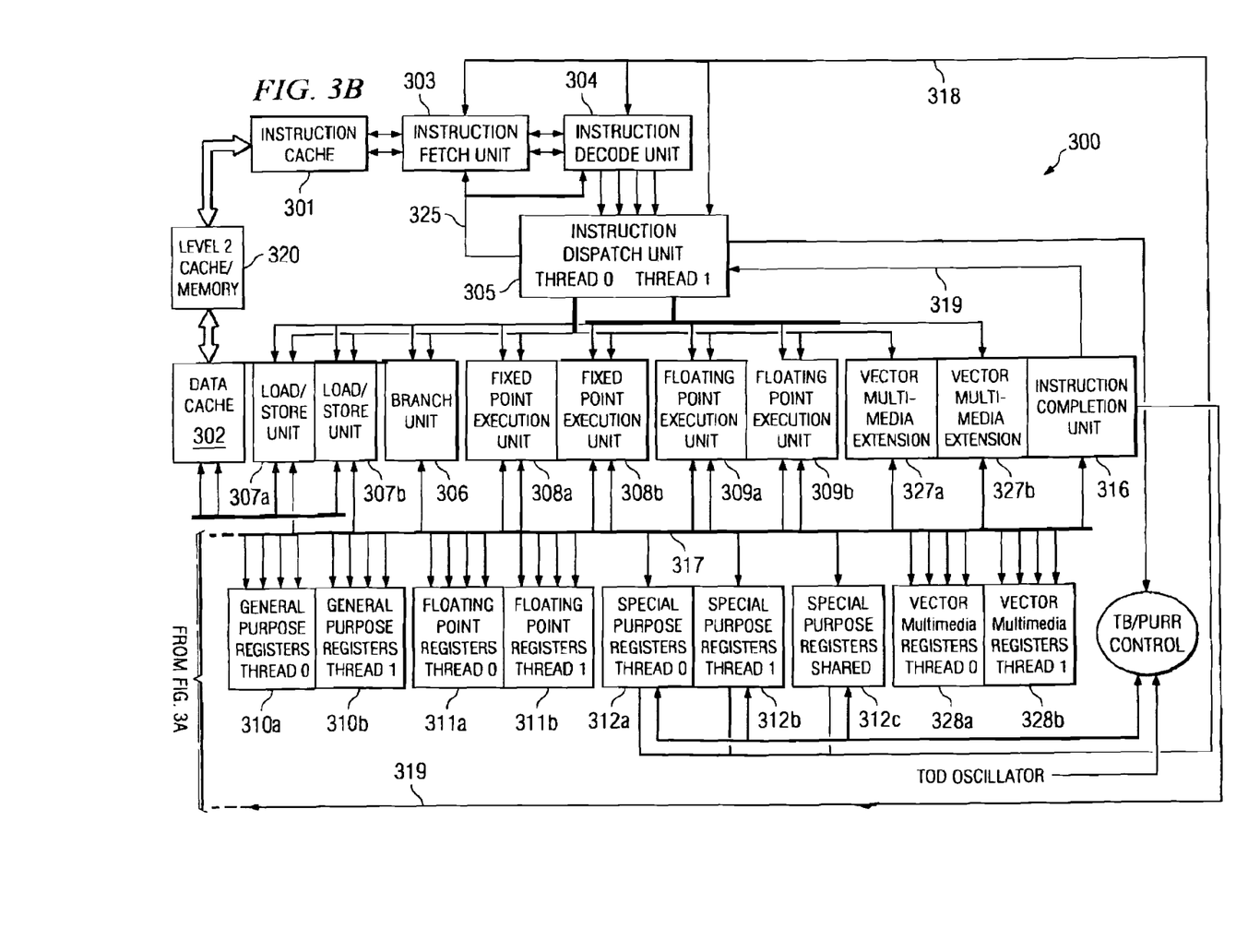

Referring to FIGS. 3A and 3B, exemplary block diagrams of a dual threaded processor design showing functional units and registers in accordance with an illustrative embodiment of the present invention is shown. Processor 300 may be implemented as processing unit 202 in FIG. 2 in these illustrative examples. Processor 300 comprises a single integrated circuit superscalar microprocessor with dual-thread SMT. Accordingly, as discussed further herein below, processor 300 includes various units, registers, buffers, memories, and other sections, all of which are formed by integrated circuitry. Also, in an illustrative embodiment of the present invention, processor 300 operates according to reduced instruction set computer (RISC) techniques.

As shown in FIGS. 3A and 3B, instruction fetch unit (IFU) 303 connects to instruction cache 301. Instruction cache 301 holds instructions for multiple programs (threads) to be executed. Instruction cache 301 also has an interface to level 2 (L2) cache/memory 320. Instruction fetch unit (IFU) 303 requests instructions from instruction cache 301 according to an instruction address, and passes instructions to instruction decode unit 304. In an illustrative embodiment of the present invention, instruction fetch unit (IFU) 303 can request multiple instructions from instruction cache 301 for up to two threads at the same time. Instruction decode unit 304 decodes multiple instructions for up to two threads at the same time and passes decoded instructions to instruction dispatch unit (IDU) 305. Instruction dispatch unit (IDU) 305 selectively groups decoded instructions from instruction decode unit 304 for each thread, and outputs a group of instructions for each thread to execution circuitries 306, 307a, 307b, 308a, 308b, 309a, 309b, 327a, and 327b of the processor.

In an illustrative embodiment of the present invention, the execution circuitry of the processor may include branch unit 306, fixed-point execution units (FXUA) 308a and (FXUB) 308b, load/store units (LSUA) 307a and (LSUB) 307b, floating-point execution units (FPUA) 309a and (FPUB) 309b, and vector multimedia extension units (VMXA) 327a and (VMXB) 327b. Execution units 306, 307a, 307b, 308a, 308b, 309a, 309b, 327a, and 327b are fully shared across both threads. The processor includes multiple register sets 310a, 310b, 311a, 311b, 312a, 312b, 312c, 328a, and 328b separately for each of the two threads, namely general purpose registers (GPR) 310a and 310b, floating-point registers (FPR) 311a and 311b, special purpose registers (SPR) 312a and 312b and vector registers (VR) 328a and 328b. The processor additionally includes a set of special purpose registers (SPR) 312c which is shared across both threads. Simplified internal bus structure 317 is shown to depict connections between execution units 306, 307a, 307b, 308a, 308b, 309a, 309b, 327a, and 327b and register sets 310a, 310b, 311a, 311b, 312a, 312b, 312c, 328a, and 328b. Simplified internal bus structure 317 also may be connected to recovery unit 315, as shown by arrow 324.

FPUA 309a and FPUB 309b input their register source operand information from and output their destination register operand data to FPRs 311a and 311b according to which thread each executing instruction belongs to. FXUA 308a, FXUB 308b, LSUA 307a, and LSUB 307b input their register source operand information from and output their destination register operand data to GPRs 310a and 310b according to which thread each executing instruction belongs to. A subset of instructions executed by FXUA 308a, FXUB 308b, and branch unit 306 use special purpose registers (SPR) 312a, 312b, and 312c as source and destination operand registers. LSUA 307a and LSUB 307b input their storage operands from and output their storage operands to data cache 302 which stores operand data for multiple programs (threads). VMXA 327a and VMXB 327b input their register source operand information from and output their destination register operand data to VRs 328a and 328b according to which thread each executing instruction belongs to. Data cache 302 also has an interface to level 2 cache/memory 320.

Data cache 302 may also have (not shown) associated with it a non-cacheable unit which accepts data from the processor and writes it directly to level 2 cache/memory 320, thus bypassing the coherency protocols required for storage to cache.

In response to the instructions input from instruction cache 301 and decoded by instruction decode unit 304, instruction dispatch unit (IDU) 305 selectively dispatches the instructions to execution units 306, 307a, 307b, 308a, 308b, 309a, 309b, 327a, and 327b. Execution units 306, 307a, 307b, 308a, 308b, 309a, 309b, 327a, and 327b execute one or more instructions of a particular class of instructions. For example, FXUA 308a and FXUB 308b execute fixed-point mathematical operations on register source operands, such as addition, subtraction, ANDing, ORing and XORing. FPUA 309a and FPUB 309b execute floating-point mathematical operations on register source operands, such as floating-point multiplication and division. LSUA 307a and LSUB 307b execute load and store instructions which move operand data between data cache 302 and registers 310a, 310b, 311a, and 311b. VMXA 327a and VMXB 327b execute single instruction operations that include multiple data. Branch unit 306 executes branch instructions which conditionally alter the flow of execution through a program by modifying the instruction address used by instruction fetch unit (IFU) 303 to request instructions from instruction cache 301.

Instruction dispatch unit (IDU) 305 groups together decoded instructions to be executed at the same time, depending on the mix of decoded instructions and available execution units 306, 307a, 307b, 308a, 308b, 309a, 309b, 327a, and 327b to perform the required operation for each instruction. For example, because there are only two load/store units 307a and 307b, a maximum of two load/store type instructions may be grouped together. In an illustrative embodiment of the present invention, up to seven instructions may be grouped together (two fixed-point arithmetic, two load/store, two floating-point arithmetic or two vector multimedia extension, and one branch), and up to five instructions may belong to the same thread. Instruction dispatch unit (IDU) 305 includes in the group as many instructions as possible from the higher priority thread, up to five, before including instructions from the lower priority thread. However, either FPU instructions 309a and 309b or VMX instructions 327a and 327b are dispatched in the same group with fixed point instructions. FPU instructions 309a and 309b and VMX instructions 327a and 327b are never dispatched in the same group. Values in special purpose registers 312a and 312b indicate thread priority 318 to instruction dispatch unit (IDU) 305.

Instruction completion unit 316 monitors internal bus structure 317 to determine when instructions executing in execution units 306, 307a, 307b, 308a, 308b, 309a, 309b, 327a, and 327b are finished writing their operand results. Instructions executed by branch unit 306, FXUA 308a, FXUB 308b, LSUA 307a, and LSUB 307b require the same number of cycles to execute, while instructions executed by FPUA 309a, FPUB 309b, VMXA 327a, and VMXB 328b require a variable, and a larger number of cycles to execute. Therefore, instructions that are grouped together and start executing at the same time do not necessarily finish executing at the same time. When all the instructions grouped together within a thread are finished writing their operand results, the group is said to be "completed."

Instruction completion unit 316 monitors for the completion of instructions, and sends control information 319 to instruction dispatch unit (IDU) 305 to identify that more groups of instructions can be dispatched to execution units 306, 307a, 307b, 308a, 308b, 309a, 309b, 327a, and 327b. Instruction dispatch unit (IDU) 305 sends control information 325 to instruction fetch unit (IFU) 303 and instruction decode unit 304 to indicate that it is ready to receive more decoded instructions.

Processor 300 preferably also includes error detection circuitry (not shown on FIGS. 3A and 3B) throughout all functional units, and recovery unit 315 which contains a backup copy of registers 310a, 310b, 311a, 311b, 312a, 312b, 312c, 327a, and 327b for both threads. Results written to register sets 310a, 310b, 311a, 311b, 312a, 312b, 312c, 327a, and 327b are also written to queue structures 313a, 313b, 314a, 314b, 329a, and 329b over internal bus structure 317. Register results from branch unit 306, FXUA 308a, FXUB 308b, LSUA 307a, and LSUB 307b are held in write queue 313a and 313b according to which thread the associated instruction belongs to. Register results from VMXA 327a and VMXB 327b are held in stage queues 329a and 329b according to which thread the associated instruction belongs to. Write queues 313a and 313b for each thread is a simple first-in-first-out (FIFO) queue structure. Because instructions executed by FPUA 309a and FPUB 309b require a variable, and a larger number of cycles to execute, and may complete out-of-order, these results are written to FPR reorder buffers 314a and 314b according to which thread the associated instruction belongs to. FPR reorder buffers 314a and 314b arranges for each thread the results from FPUA 309a and FPUB 309b in the sequence which the associated instructions occurred in the program originally supplied by instruction cache 301.

The register results are held in write queues 313a and 313b, FPR reorder buffers 314a and 314b, and stage queues 329a and 329b for each thread until instruction completion unit 316 indicates (via control 319) that all instructions in the group have completed for each thread. If no errors are reported by the error detection circuitry (not shown in FIGS. 3A and 3B), the results are drained from queue structures 313a, 313b, 314a, 314b, 329a, and 329b into the backup copy of the associated registers in recovery unit 315. In the event of an error, recovery unit 315 discards the contents of write queues 313a and 313b, FPR reorder buffers 314a and 314b, and stage queues 329a and 329b for each thread, and restores the backup copy of register sets 310a, 310b, 311a, 311b, 312a, 312b, 312c, 328a, and 328b using internal bus structure 317. Processing may then be resumed from the known error-free instruction boundary. The process of copying, storing for a time and discarding such sets is known as checkpointing. There may be several such sets or backup copies stored in the recovery unit 315, and each set may be discarded on a FIFO basis, wherein each successive set represents the state of the registers after processing each group of instructions, wherein each set is known as a checkpoint.

Some of the special purpose registers (SPR) 312a, 312b, and 312c hold information used to control the operation of the various functional units. This control is represented, simplified, in FIGS. 3A and 3B by connection 318. Special purpose registers (SPR) 312a and 312b have separate copies for each thread, while 312c is shared across all threads. Not limited to these examples, special purpose registers (SPR) 312a, 312b, and 312c may include instruction addresses, thread priority control, condition code, save/restore addresses, machine state, etc.

Scattered among the units and registers of the processor core 300, are a number of circuits known as pervasives core. Such circuits are driven by a system clock that may be turned off or blocked to all simultaneously. The circuits draw little power and consequently generate little heat while no clocking is provided to them. The circuits include functions such as overriding the normal operation of their host units and placing their respective hosts into a recovery mode.

In an illustrative embodiment of the present invention, the superscalar P6 processor has two fixed point execution pipelines (FXU), two load/store pipelines (LSU), two floating point execution pipelines (FPU), two vector multimedia extension pipelines (VMX) and one branch execution pipeline (BRU). The processor supports executing two independent instruction streams (threads) simultaneously. It can dispatch up to seven instructions each processor cycle, across both threads, with up to five instructions from the same thread. The FXU and LSU execution pipelines are the same depth, but are shorter than the FPU or VMX pipelines. Instructions that execute in the FXU and LSU execute in-order with respect to each other, but out-of-order with respect to instructions which execute in the FPU or VMX. Instructions which execute in the FPU execute out-of-order with respect to each other, and with respect to the FXU/LSU/BRU. VMX instructions take longer to execute than FXU/LSU/BRU instructions, and hence complete out-of-order with respect to them. Floating point loads are executed by the LSU, so both the LSU and FPU pipelines can update floating point registers (FPRs).

Working copies of registers are maintained in register files integrated within the execution pipelines, general purpose registers (GPRs) in the FXU, and floating point registers (FPRs) in the FPU. These working copies are updated, and available for further use, as soon as an instruction finishes executing, while a separate checkpointed copy of all registers is maintained in an ECC protected checkpoint array (set of register files). Updates to the checkpoint array are delayed from the working registers to allow for error detection and reporting, where a reported error blocks all further checkpoint updates so that the checkpoint remains intact at a coherent instruction boundary.

The handling of branches is not significant to the different aspects of this invention, nor is the handling of the multiple threads. Although easily expandable across many independent threads, using separate, duplicate resources, this invention specifically applies to the managing of the checkpoint within a thread. There are also several dedicated interfaces for managing special purpose registers (SPRs), but unless explicitly noted, they are not significant to this invention.

Checkpoint management is primarily controlled by a recovery unit (Runit). The Runit contains queues to accumulate register results from the pipelines until they are ready to be checkpointed (write queues), and the register files that make up the checkpoint array. The checkpoint is maintained on an instruction group boundary.

Aspects of the present invention provide for detecting and handling instruction flush in a microprocessor system by using a flush mechanism that is distributed across all of the execution units in a microprocessor system. The flush mechanism does not require a central collection point to re-distribute the flush signals to the execution units. Each unit is capable of issuing control signals to block all register updates and generating a flush vector to the other execution units. A flush vector indicates the thread of the instruction being flushed, along with whether the current instruction completes execution and the refetch should start at the next instruction (N+1 flush), or the current instruction did not complete execution, and the current instruction must be refetched.

Figure 4:
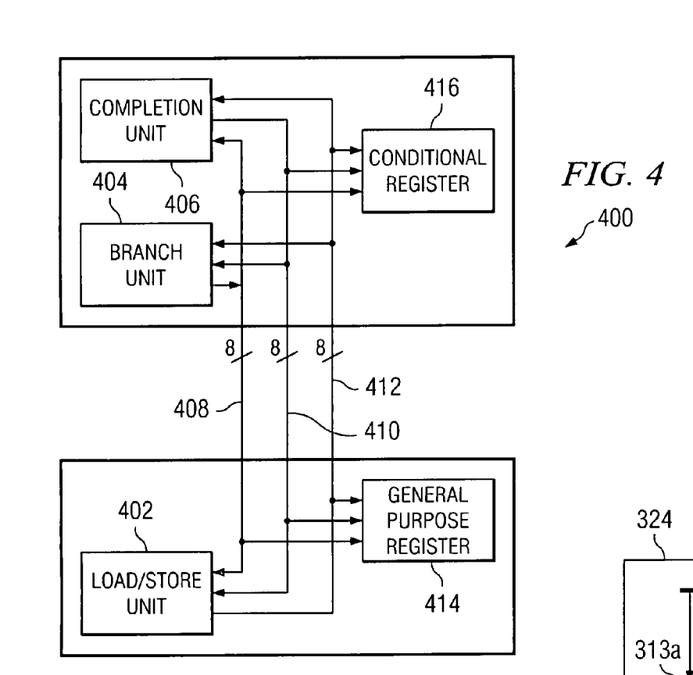
FIG. 4 depicts a distributed flush mechanism in accordance with an illustrative embodiment of the present invention.

Turning to FIG. 4, a distributed flush mechanism is depicted in accordance with an illustrative embodiment of the present invention. In distributed flush mechanism 400, three execution units are shown which are capable of generating a flush condition: load/store unit (LSU) 402, branch unit (BRU) 404, and completion unit 406. Load/store unit 402 may be a load/store unit such as load/store unit 307a or 307b of FIGS. 3A and 3B. Branch unit 404 may be a branch unit such as branch unit 306 of FIGS. 3A and 3B. Completion unit 406 may be a completion unit such as instruction completion unit 316 of FIGS. 3A and 3B. While only three execution units are shown in the exemplary embodiment, aspects of the present invention may be extended to additional as well as different types of execution units, such as those execution units described in FIGS. 3A and 3B.

Each of the three execution units, load/store unit 402, branch unit 404, and completion unit 406, generate an 8 bit flush vectors 408, 410, and 412. The 8 bit flush vector will be further described in FIG. 5. In addition, each of the three exemplary units receives all three 8 bit flush vectors 408, 410, and 412. To ensure logically correct operation, when an instruction flush occurs, all younger instructions in flight are flushed from the pipeline. Additionally, these younger instructions which are flushed cannot update the architected state of the microprocessor. The prevention of updating the architected state of the microprocessor includes, for example, updates to the general purpose register (GPR) 414 and conditional register (CR) 416. Load/store unit 402 receives all of the flush vectors and blocks general purpose register 414 updates. Branch unit 404 receives all of the flush vectors and blocks conditional register 416 updates.

Figure 5:
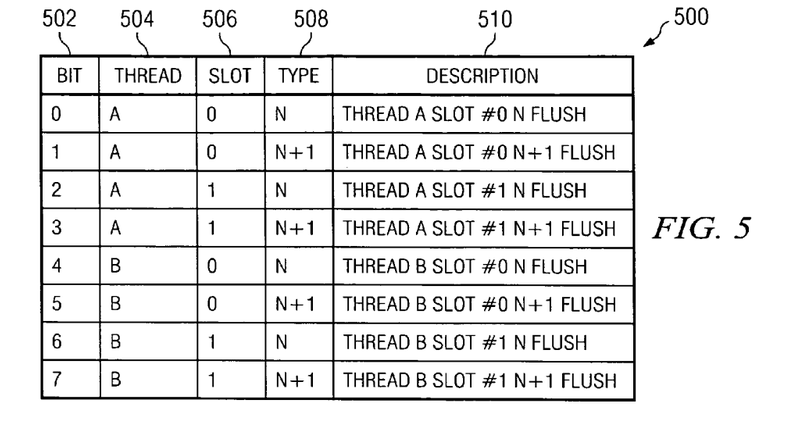
FIG. 5 depicts an 8 bit flush vector in accordance with an illustrative embodiment of the present invention.

FIG. 5 depicts an 8 bit flush vector in accordance with an illustrative embodiment of the present invention. Flush vector 500 is composed of bit 502, thread 504, slot 506, type 508, and description 510. In this exemplary embodiment, bit 502 is indicated as bits 0-7. Thread 504 is indicated as threads A and B; however, one or more threads may be supported. Slot 506 is indicated as 0 or 1. Slot 506 is 0 for an older instruction plus a younger instruction and is 1 for only a younger instruction. A slot refers to the number of instructions that may execute concurrently within the same thread in a given pipe stage. It may be possible to have M threads and K slots; however, threads and slots are completely independent of each other. Type 508 indicates the flush type, either current and/or next. Type 508 is an N flush if the current instruction must be flushed. Type 508 is an N+1 flush if the current instruction is okay to process but the next instruction must flush. The N+1 flush does not block register write for the current instruction, but does block register write for all following instructions of the given thread. In the event that multiple flushes are issued at the same time, with one flush being an N+1 flush and the other being an N flush, then the N flush is given higher priority. Description 510 is an overall summary of each bit 0-7 in bit 502.

Figure 6:
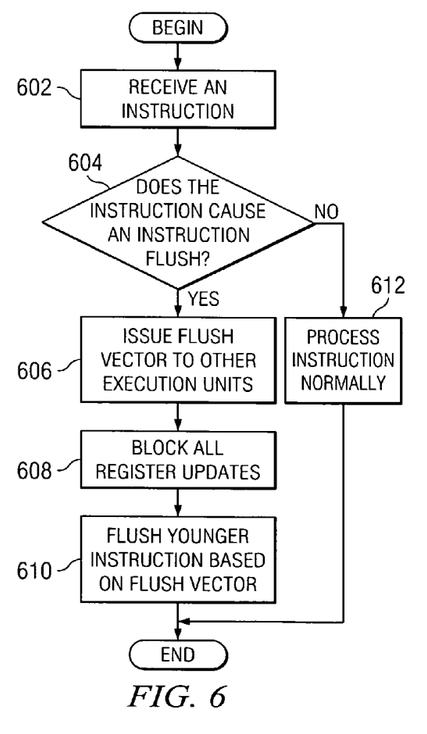
FIG. 6 depicts a flow diagram of an exemplary operation of the distributing flush mechanism in accordance with an illustrative embodiment of the present invention.

FIG. 6 depicts a flow diagram of an exemplary operation of the distributing flush mechanism in accordance with an illustrative embodiment of the present invention. The operation begins when an instruction is received at an execution unit (step 602) and the execution unit determines whether the instruction causes an instruction flush (step 604). Although the description is for one execution unit, one or more execution units may be capable of receiving an instruction and determining whether the received instruction causes an instruction flush. If the instruction causes an instruction flush, the execution unit issues a flush vector to all other execution units (step 606). This flush vector is also used as the control signal to block the execution unit's register file updates (step 608). All the execution units blocking their respective register file updates, results in all register file updates being blocked. All of the younger instructions are then flushed from the execution units based upon the vector received from the initiating execution unit as well as the younger instructions from the initiating execution unit (step 610) with the operation ending thereafter. Returning to step 604, if the instruction is not an instruction flush, the execution unit processes the instruction normally (step 612), with the operation ending thereafter.

Figure 7:
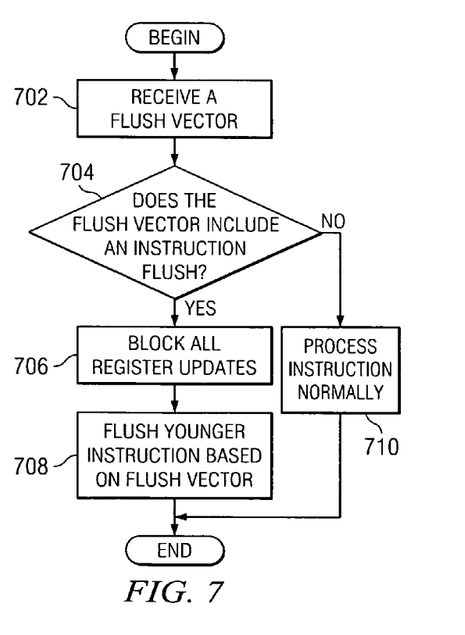
FIG. 7 depicts a flow diagram of an exemplary operation of an execution unit receiving a flush vector in accordance with an illustrative embodiment of the present invention.

FIG. 7 depicts a flow diagram of an exemplary operation of an execution unit receiving a flush vector in accordance with an illustrative embodiment of the present invention. As the operation begins an execution unit receives a flush vector from an initiating execution unit that received an instruction that caused an instruction flush (step 702). The execution unit determines whether the flush vector includes an instruction flush (step 704). If the flush vector includes an instruction flush, the execution unit sends the flush vector as a control signal to all registers to blocks register updates (step 706). All the execution units blocking their respective register file updates, results in all register file updates being blocked. All of the younger instructions are then flushed from the execution unit based upon the vector received from the initiating execution unit (step 708) with the operation ending thereafter. Returning to step 704, if the flush vector does not include an instruction flush, the execution unit processes the instruction normally (step 710), with the operation ending thereafter.

Thus, the flush mechanism is distributed in a high frequency design to multiple units which control their own local register files. This eliminates several pipeline stages which would be required if the flush mechanism were centralized.

Aspects of the present invention provide for detecting and handling instruction flush in a microprocessor system by using a flush mechanism that is distributed across all of the execution units in a microprocessor system. The flush mechanism does not require a central collection point to re-distribute the flush signals to the execution units. Control signals from the execution units block register updates and generate a flush vector to all other execution units.

Aspects of the present invention may take the form of an entirely hardware embodiment, an entirely software embodiment or an embodiment containing both hardware and software elements. In an aspect of an illustrative embodiment, the invention may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for a distributed flush mechanism, the method comprising:
    receiving an instruction in a first execution unit of a plurality of execution units, wherein every execution unit of the plurality of execution units is configured to issue control signals and generate a flush vector directly to every other execution unit of the plurality of execution units, wherein each bit in the flush vector is indicative of all of a thread value, a slot value, and a type value, wherein the thread value indicates an origination thread from which the instruction originated, wherein the thread value indicates one or more threads, wherein the slot value indicates one of an older instruction plus a younger instruction when the slot value is a first slot value and indicates only a younger instruction when the slot value is a second slot value, wherein the type value indicates an instruction type, wherein the type value indicates the instruction completes execution and the refetch should start at a next instruction when the type value is a first type value and indicates the instruction did not complete execution and the instruction must be refetched when the type value is a second type value, wherein each execution unit controls a corresponding one of a plurality of local register files, wherein each execution unit is associated with a corresponding one of a plurality of registers, wherein each of the plurality of registers is selected from one of a general purpose register, a floating point register, a special purpose register, a vector multi-media register, or a conditional register, and wherein each execution unit in the plurality of execution units is one of a load/store unit, a branch unit, a completion unit, a floating point unit, a fixed point unit, or a vector multi-media unit;
    determining, before completing execution of the instruction, if the instruction causes an instruction flush, wherein a cause of the instruction flush is an exception;
    in response to a determination that the instruction causes the instruction flush, issuing the flush vector from the first execution unit directly to all other execution units of the plurality of execution units and issuing a control signal from the first execution unit to block all register updates in the local register file corresponding to the first execution unit; in response to the issuing the flush vector from the first execution unit directly to all other execution units of the plurality of execution units, issuing a control signal from all other execution units of the plurality of execution units to their corresponding local register files in order to block register updates, wherein the control signal comprises the flush vector, wherein a central collection point is not required to re-distribute the flush vector to the plurality of execution units, wherein a load/store unit receives the flush vector and blocks a general purpose register in the plurality of registers from being updated, and wherein a branch unit receives the flush vector and blocks a conditional register in the plurality of registers from being updated;
    flushing younger instructions based on the flush vector; and
    blocking all register updates in the plurality of registers.

* * * * *